United States Patent [19]
Mott et al.

[11] Patent Number: 5,026,332
[45] Date of Patent: Jun. 25, 1991

[54] CHAIN-BELT

[75] Inventors: Philip J. Mott, Dryden; Roger K. Updike, Sr., Ithaca; David C. White, Dryden, all of N.Y.

[73] Assignee: Borg-Warner Automotive Transmission & Engine Components Corporation, Sterling Heights, Mich.

[21] Appl. No.: 496,488

[22] Filed: Mar. 20, 1990

[51] Int. Cl.$^5$ .............................................. F16G 1/24
[52] U.S. Cl. ..................... 474/242; 474/245
[58] Field of Search ........................ 474/201, 242–245, 474/213–217

[56] References Cited

U.S. PATENT DOCUMENTS

| | | | |
|---|---|---|---|
| 3,407,672 | 10/1968 | Keller | 474/242 |
| 4,337,057 | 6/1982 | Horowitz et al. | 474/242 |
| 4,386,922 | 6/1983 | Ivey | 474/242 |
| 4,464,152 | 8/1984 | Kern | 474/245 |
| 4,569,671 | 2/1986 | Ledvina | 474/201 |
| 4,767,388 | 8/1988 | Tatara et al. | 474/245 |

FOREIGN PATENT DOCUMENTS

62-110045  5/1987  Japan .

*Primary Examiner*—William P. Neuder
*Attorney, Agent, or Firm*—Emch, Schaffer, Schaub

[57] ABSTRACT

A power transmission (10) chain-belt (32) is disclosed that is especially adaptable for connecting the pulleys (12, 14) of a pulley transmission (10). The chain-belt (32) has a plurality of interleaved sets (34) of links (36) and each set (34) has a plurality of transversely arranged links (36). Pivot means (40) join adjacent sets (34) of links (36) to form an endless loop. At least one toe (42A, 42B) extends from each link (36) in at least some sets (34) of links (36). At least the toes (42A, 42B) on adjacent links (36) are in opposed relationship and define a passageway (80). A plurality of load blocks (50) are connected to the sets (34) of links (36). The load blocks (50) are positioned in the passageways (80) defined by the toes (42A, 42B). Each load block (50) has edge surfaces (88) for contacting the pulleys (12, 14) of the transmission (10). At least one spring link (131) positioned in said sets (34) of interleaved links (36). The spring link (131) has a pair of spaced apart, opposed toes (132A, 132B) that define a channel (134) for receiving a load block (50). The channel (134) of the spring link (131) has a press fit with the load block (50) whereby the spring link (131) restrains the load block (50) from movement transverse to the direction of travel of the chain belt (32) and retains the load block (50) in the passageway (80) defined by the sets (34) of links (36).

24 Claims, 15 Drawing Sheets

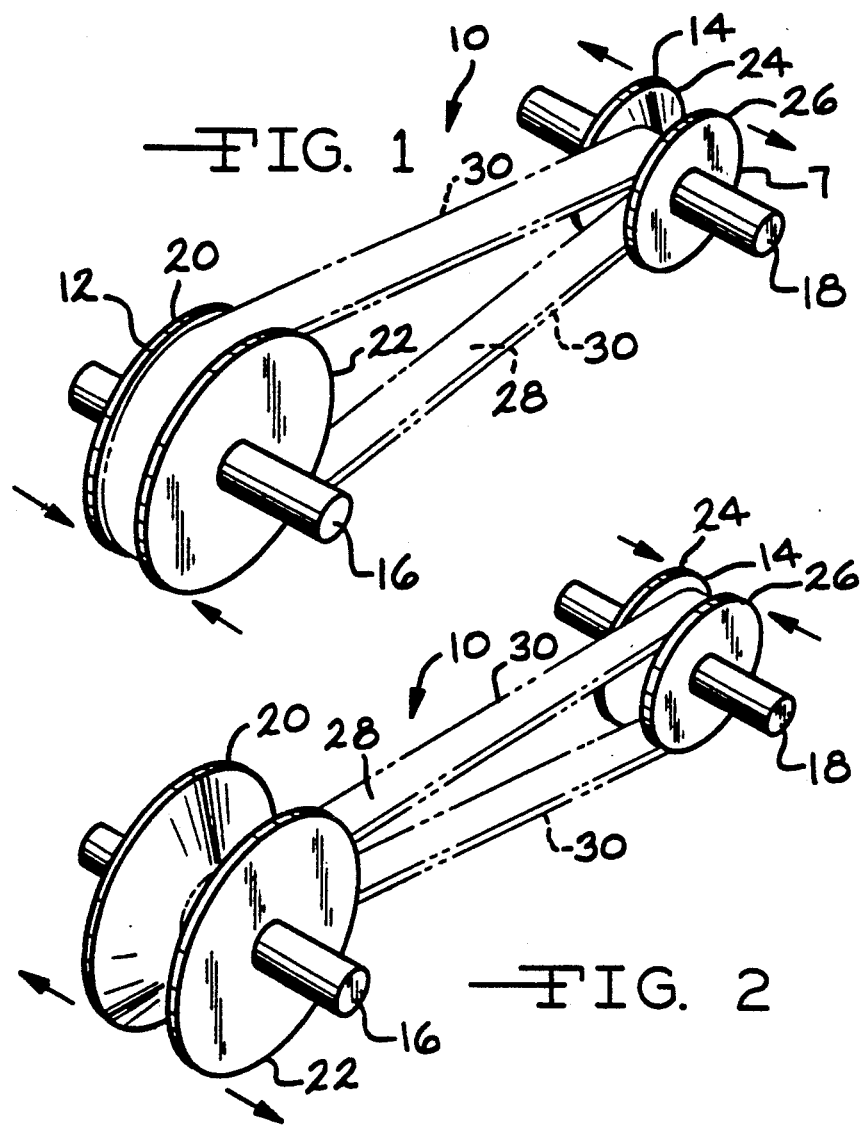

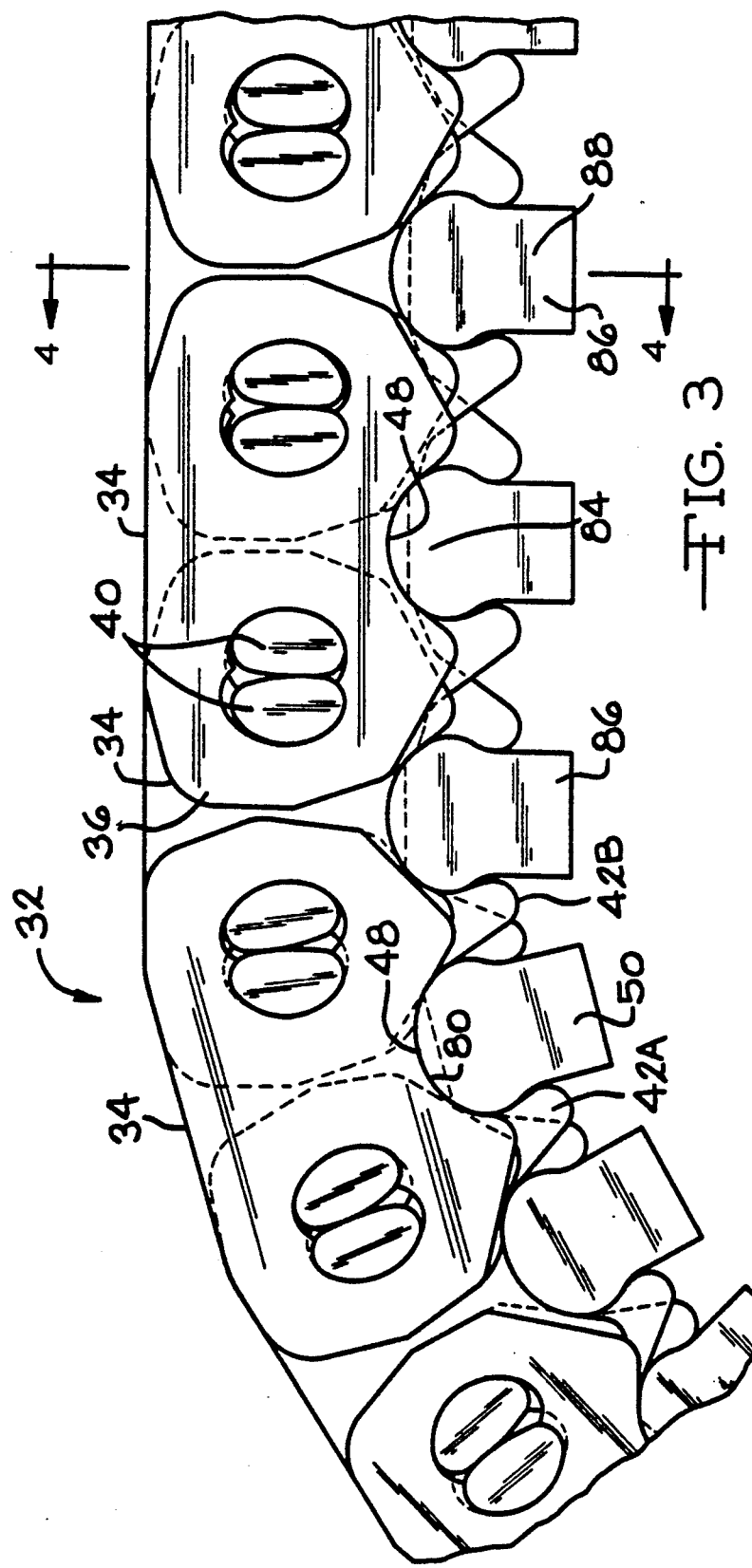

CHAIN-BELT

TECHNICAL FIELD

This invention relates to metal chain-belts especially adapted to connect the pulleys of a pulley transmission, particularly a continuously variable transmission (CVT), and broadly comprises a tension member or carrier constructed of a plurality of interlaced links arranged in transverse sets with the adjacent sets joined by pivot means, and load blocks carried by the carrier for engaging the pulleys.

BACKGROUND ART

Variable pulley transmissions for transferring torque from an input or drive shaft to an output or driven shaft have been used for some time. In these transmissions, a first pulley constructed of a pair of flanges, at least one of which is conical, is mounted on the input shaft such that at least one of its flanges is axially movable with respect to its other flange. A second, similarly constructed and adjustable pulley is mounted on the output shaft. A flexible belt connects the two pulleys to transfer torque therebetween when the input shaft is driven. As the effective diameter of one pulley is changed, the effective diameter of the other pulley is changed in the other direction and, the drive ratio between the input and output shafts is adjusted in a smooth, continuous manner.

Automotive engineers have long recognized that the maximum operating efficiency of the engine could be achieved if the transmission could be controlled by adjusting to different loads and speed ratios, such that the engine is maintained and operated at its maximum efficiency operating conditions. This has not been possible when a conventional geared transmission is teamed with an engine. In the conventional geared transmission, the drive ratio is adjusted in discrete steps, rather than continuously. Accordingly, efforts have been directed to the use of a continuously varible transmission (CVT) of the type described above. The efforts have resulted in the production and marketing in Europe of the DAF passenger car, using flexible, continuous rubber belt to drivingly interconnect the pulleys. Rubber belts have been considered to be inferior to metal belts because of various adverse conditions under which they must operate. More recently, Fiat and Volvo have produced automobiles incorporating CVT's using respectively, metal belts and rubber belts. Some of the efforts to produce metal belts which are durable, relatively quiet in operation, and also economical to market, are described in the patent and other literature.

Flexible metal belts for use in CVT's are generally of two varieties, those referred to as "push" belts and those referred to as "pull" belts. Push belts are currently being used in the Fiat automobile's CVT. An example of a push belt is described in Van Doorne et al., U.S. Pat. No. 3,720,113 and an example of a pull belt is described in Cole, Jr., et al., U.S. Pat. No. 4,313,730. The Van Doorne et al. belt comprises an endless carrier constructed of a plurality of nested metal bands and an endless array of generally trapezoidal (when viewed from the front) load blocks encircling the carrier and longitudinally movable therealong. Each block has edge surfaces engaging the pulley's flanges of a pulley transmission to transmit torque between the pulleys. The pull belt of Cole, Jr. et al., utilizes an endless chain as the carrier, the sets of links of which are pivotably interconnected by pivot means. Load blocks, similar to those of Van Doorne et al., encircle the links; however, the load blocks are contrained against longitudinal movement along the chain by the pivot means.

Another example of a pull belt is shown in Ledvina, U.S. Pat. No. 4,569,671 which utilizes a chain-belt comprising a plurality of interleaved sets of links and load blocks associated therewith. Each link is defined by toes, the toes of each link being defined by parallel inside flanks joined by a crotch. A load block is received between the inside flanks and extends around the links. A hardened insert is located between the links and the blocks to protect the links and improve the durability of the chain.

The push belt as described above is relatively expensive to manufacture and must be installed and/or replaced as a complete endless loop. Thus, disassembly of at least part of the pulley transmission is required, not only for the initial assembly, but also for replacement of the push belt due to failure of one or more load blocks or one or more of the carrier bands.

The pull belt offers a less expensive alternative to the push belt. No precise matching of carrier parts is required. The belt can be assembled with a finite length, positioned around the pulleys, and the ends then connected by a pivot member. Thus disassembly of the pulleys is not required in either for initial installation or replacement of a belt.

DISCLOSURE OF THE INVENTION

A power transmission (10) chain-belt (32) is disclosed that is especially adaptable for connecting the pulleys (12, 14) of a pulley transmission (10). The chain-belt (32) has a plurality of interleaved sets (34) of links (36) and each set (34) has a plurality of transversely arranged links (36). Pivot means (40) join adjacent sets (34) of links (36) to form an endless loop. At least one toe (42A, 42B) extends from each link (36) in at least some sets (34) of links (36). At least the toes (42A, 42B) on adjacent links (36) are in opposed relationship and define a passageway (80). A plurality of load blocks (50) are connected to the sets (34) of links (36). The load blocks (50) are positioned in the passageways (80) defined by the toes (42A, 42B). Each load block (50) has edge surfaces (88) for contacting the pulleys (12, 14) of the transmission (10). At least one spring link (131) is positioned said in sets (34) of interleaved links (36). The spring link (131) has a pair of spaced apart, opposed toes (132A, 132B) that define a channel (134) for receiving a load block (50). The channel (134) of the spring link (131) has a press fit with the load block (50) whereby the spring link (131) restrains the load block (50) from movement transverse to the direction of travel of the chain belt (32) and retains the load block (50) in the passageway (80) defined by the sets (34) of links (36).

BRIEF DESCRIPTION OF THE DRAWINGS

FIG. 1 is a schematic illustration of a continuously variable transmission (CVT).

FIG. 2 is a schematic illustration of a continuously variable transmission.

FIG. 3 is a side view of the chain-belt of the present invention.

BEST MODE FOR CARRYING OUT THE INVENTION

Figure 4:
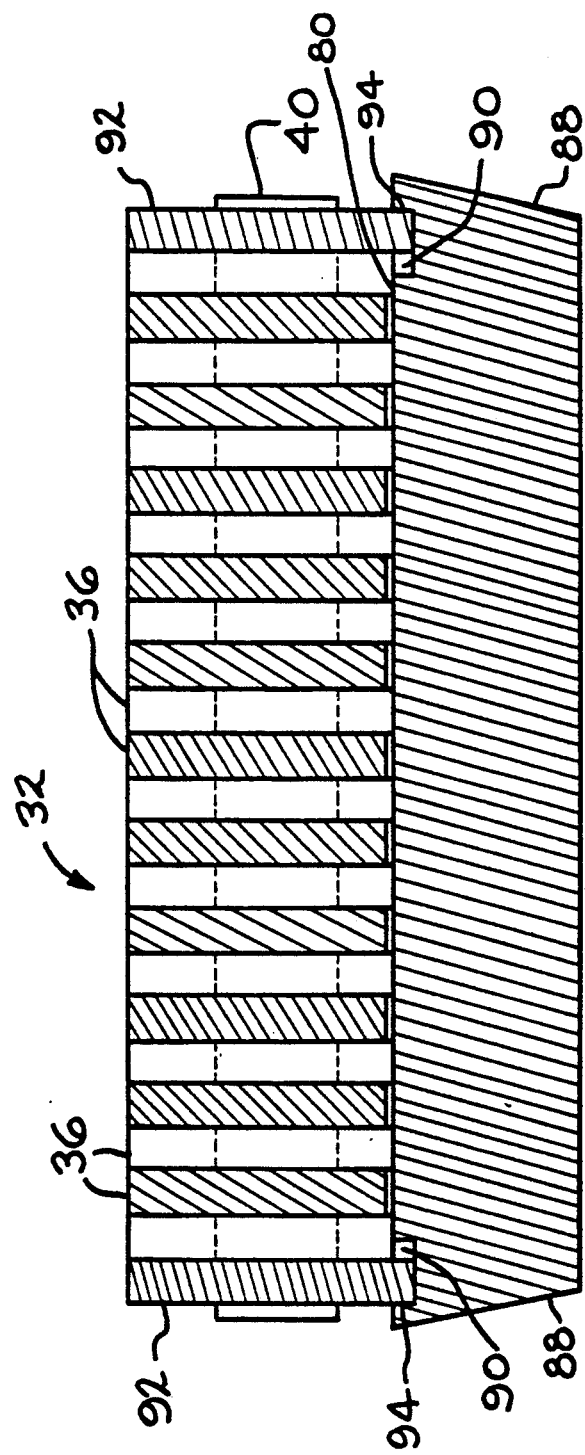
FIG. 4 is a cross-sectional view taken along line 4—4 in FIG. 3.
Figure 5:
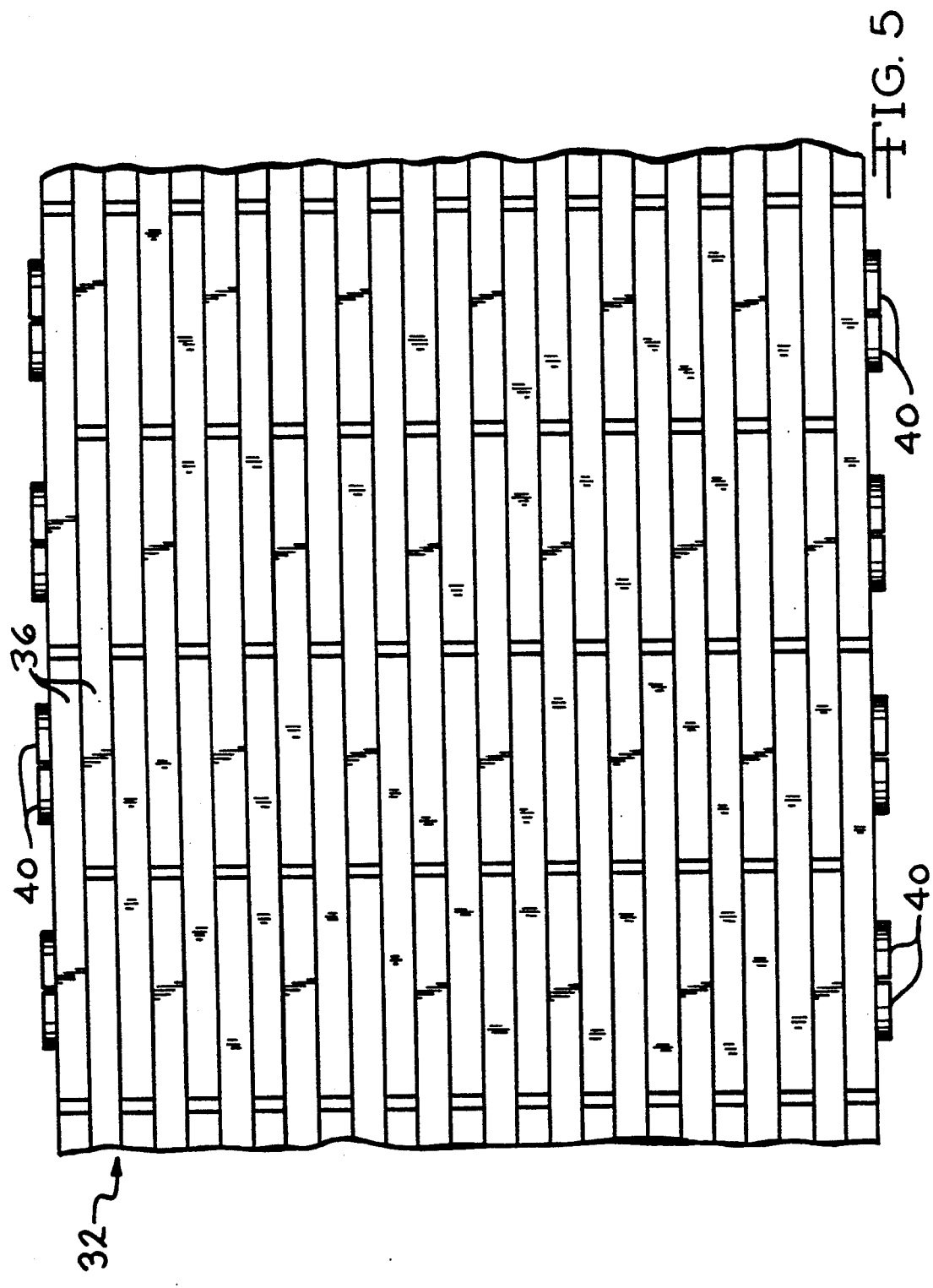
FIG. 5 is a plan view of the chain-belt.
Figure 6:
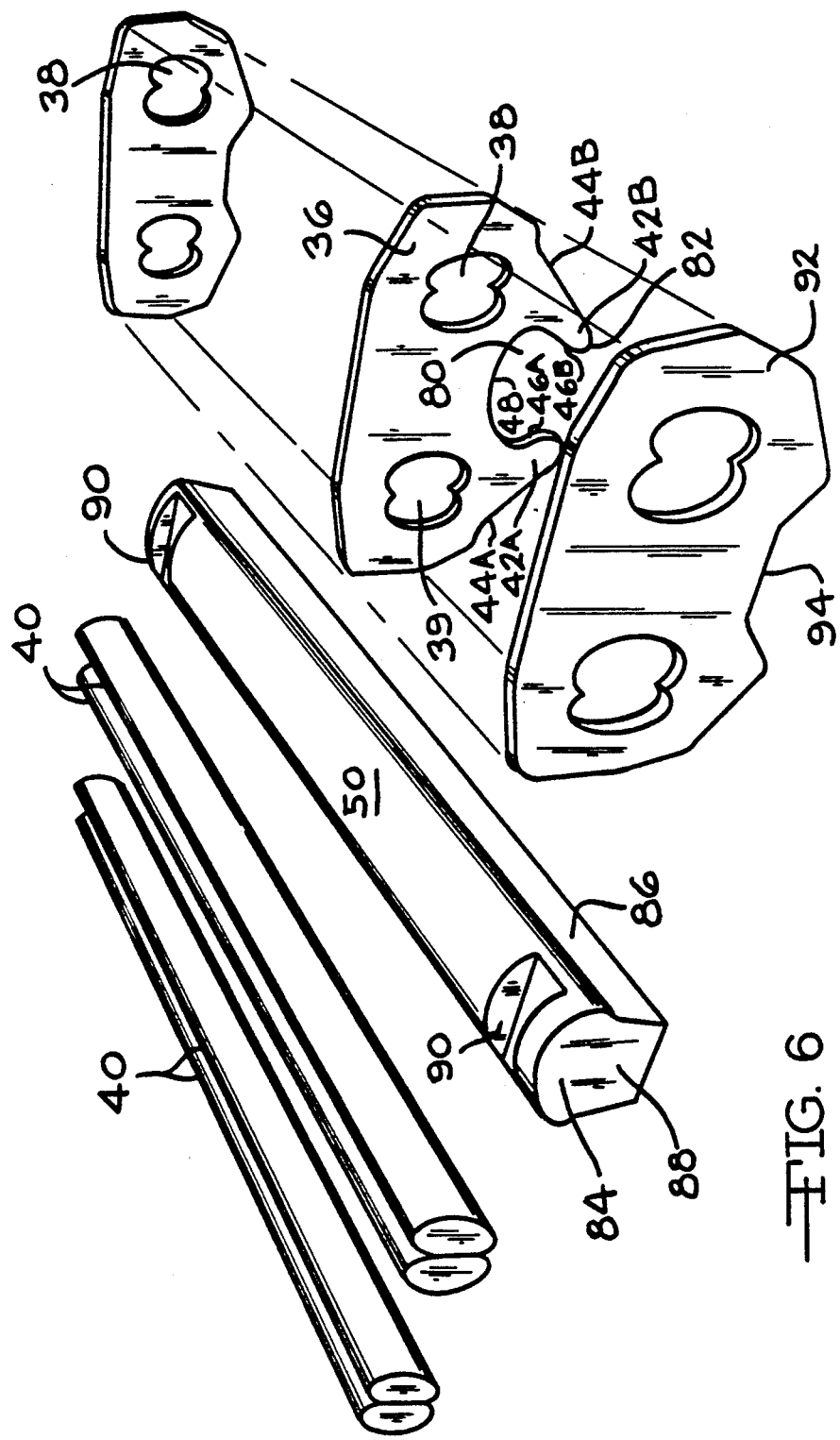
FIG. 6 is an exploded perspective view showing the components of the chain-belt of the present invention.

FIGS. 1 and 2 illustrate schematically a CVT 10 in two drive ratios. CVT 10 comprises a pair of pulleys 12 and 14 connected respectively to shafts 16 and 18, one of which is the driven shaft and the other of which is the drive shaft. Pulley 12 comprises a pair of flanges 20, 22, at least one of which is conical, and pulley 14 comprises a pair of flanges 24, 26, at least one of which is conical. The pulleys are connected by a belt 28, the side edges 30 of which frictionally engage the pulley flanges. At least one flange of each pulley is axially movable with respect to the other, so as to vary the drive ratios between the pulleys. The arrows indicate the axial movement of the flanges to effect the different drive ratios. Means—beyond the scope of this invention—can be provided for axially moving at least one flange relative to the other.

The chain-belt 32 of this invention (see FIGS. 3 and 4 showing segments of the chain-belt 32) comprises a plurality of interleaved or laced sets 34 of links 36, each link having a pair of spaced apertures 38, 39. The apertures are arranged so that pivot means 40 join adjacent sets of links to thus permit the chain-belt to articulate. Pivot means 40 are shown as being of the pin and rocker variety but any known type of pivot means may be used. Because of the lacing, alternate sets of links have a different number of links than the other sets of links.

Each link has a pair of toes 42A, 42B, which are defined by outside flanks 44A, 44B, and inside flanks 46A, 46B. The toes 42A, 42B are disposed to extend from the links in a direction towards the shafts 16, 18 of the CVT when the chain-belt is properly positioned on the CVT. The inside flanks are in spaced apart, generally opposed relationship. The inside flanks have an arcuate shape and are joined together by a curved crotch 48. The configuration of the inside flanks and the curved crotch 48 result in the opposed toes forming a substantially circular passageway 80 with the ends of the toes that are spaced apart from the pivot pins defining an opening 82.

A load block 50 is associated with each sets of links and is received in the passageway 80 formed by the opposed toes. The upper region 84 of the load blocks has the same basic shape as the passageway 80 and is only slighty smaller in size to allow the load blocks to be positioned in the passageway. The load blocks have a lower portion 86 that extends from the passageway and has ends 88 that are designed to engage the flanges of the pulleys of the CVT 10. The load blocks are preferably a solid metal block that provide a great deal of strength and resistance to wear as the CVT operates. However, it should be understood that the load blocks can be made from more than one piece of solid metal.

The load blocks 50 have a groove or notch 90 at each end. The notch is located in the upper region 84 of the load block that faces the passageway 80. The chain-belt has a retaining link 92 that is positioned as the outer link on each side of the chain-belt. The retaining links 92 have a projection 94 which extends into the passageway 80 defined by the opposed toes. The projection 94 is disposed to engage the notch 90 on the load blocks to restrain the load blocks 50 from movement in a direction transverse to the direction of travel of the chain-belt 32. In this configuration the notches 90 also act to assist in holding the links 36 together as the notches also keep the links from separating from one another.

When the chain-belt is in operation the upper region of the load blocks 50 is pushed into contact with the curved crotch 48 area of the links when the chain-belt contacts the pulleys 12 and 14 of the CVT 10. The curved crotch is a very strong section of the link and is very effective in handling the load placed on the load blocks 50. The forces encountered by the load blocks 50 are effectively distributed across the width of the links 36 and directed to the portion of the links where the links are very strong. The toes 42A and 42B do not receive much of the forces placed on the load blocks 50 by the pulleys of the CVT 10.

Figure 18:
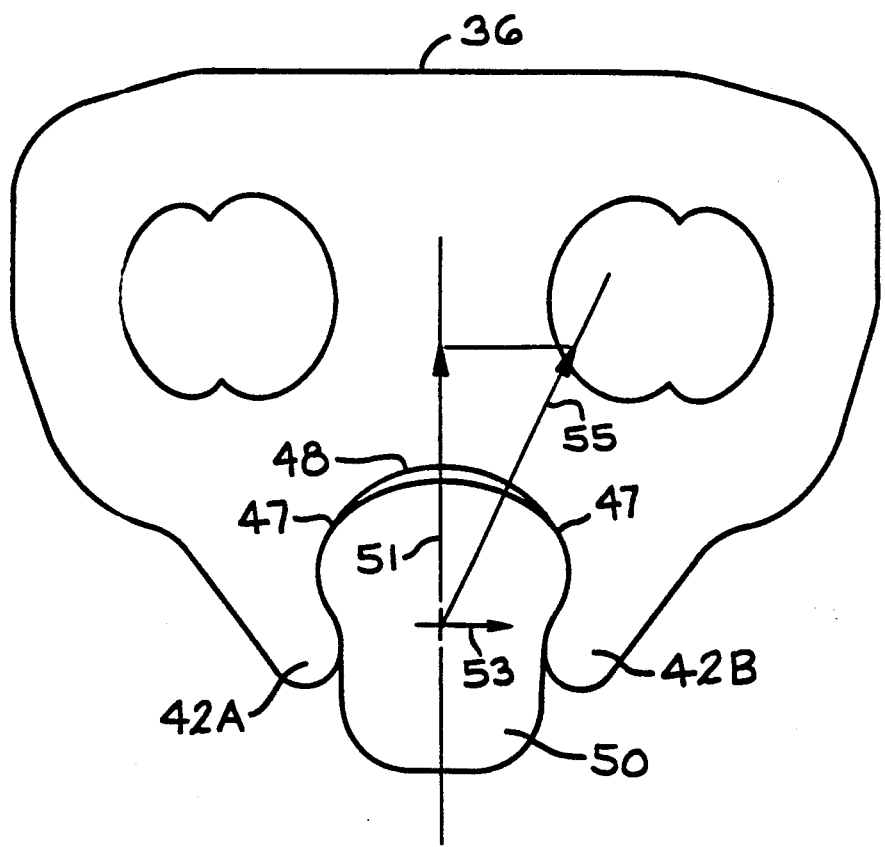
FIG. 18 is a partial side elevation view of a portion of the present invention.

The flanges of the pulleys of the CVT 10 place essentially two types of loads on the load blocks 50. The forces acting on the load blocks are shown in FIG. 18. The primary load or force on the load blocks is in a radial direction that is generally perpendicular to the direction of travel of the chain-belt. The radial force, shown as arrow 51, acts to push the load blocks 50 in a direction toward the crotch 48 of the links 36. There is also a smaller force acting on the load blocks 50 that is substantially in the tangential direction or same direction as the direction of travel of the chain-belt 32. The tangential forces are shown as arrow 53 in FIG. 18. The resultant force vector, shown as arrow 55, that results from the combination of the large radial force 51 and the smaller tangential force 53 always acts between points of contact 47 in the crotch area 48 of the links 36 as shown in FIGS. 3 and 18. The crotch 48 is also constructed so that the crotch area contacts each side of the load blocks 50 at points of contact 47. These points of contact on each side of the load blocks 50 act to stabilize the load blocks and acts to substantially eliminate rotation of the load blocks during use of the chain-belt 32. As noted above, the contact areas in the crotch 48 of the links 36 at points of contact 47 are disposed so that the resultant force vector that acts on the load blocks is always between the points of contact 47. Accordingly, the load blocks 50 are always contacted on each side by the contact area of the crotch 48 and this substantially eliminates any tendency of the load blocks 50 to rotate. Most of the forces acting on the load blocks 50 are transferred to the crotch area 48 of the links 36 and very little force is directed to the toes 42A and 42B of the links.

Although each link 36 has been described as having a pair of toes it should be recognized that it is only necessary that the toes form a passageway 80 for receiving the load blocks 50. It is possible for each link to have only one toe with the toes on adjacent links being disposed in opposed relationship to form the passageway for the load blocks 50. It is also not necessary that the toes form a substantially circular passageway 80. The toes can have different shapes as long as the passageway formed by the toes is capable of receiving the load blocks 50 and maintaining the load blocks in position adjacent the links 36. The portion of the load blocks 50 located in the passageways should be preferably shaped to transfer forces from the CVT 10 in the manner previously described.

The above construction allows the chain-belt 32 to be substantially as wide as the load blocks 50 resulting in a higher tensile capacity for this chain-belt. On prior chain-belts, the chain-belt often passed through a window or opening in the load blocks and the chain had to be narrower than the load blocks. This effectively reduced the maximum size of the chain and reduced the maximum load carrying capacity for the chain. By suspending the load blocks 50 below the chain-belt 32, the chain-belt can be wider. This allows more or heavier links to be used for the chain-belt to improve the load carrying capacity of the chain-belt. Since the load blocks 50 are positioned below the chain-belt 32 this increase in width can be accomplished without increasing the effective width of the chain-belt that is contacting the pulleys 12 and 14 of the CVT 10. In practice it has been found that the chain-belt 32 of the present invention has approximately 55% more tensile capacity than the above discribed prior art chain that is used in a CVT.

The load blocks 50 of the present invention are preferably monolithic blocks that drive directly against the links of the chain-belt 32. The monolithic load blocks 50 are stronger than the prior art load blocks that were formed from several plates that were positioned in adjacent relationship to form a load block. These prior art load blocks also contained a window or opening and the chain-belt was positioned in the opening. The present load blocks preferably are a solid piece and do not have an opening or window extending through the load block. These load blocks 50 are considerably stronger than the prior art load blocks and more readily accept the high loads and difficult operating conditions that exist in a CVT. The outside edges 88 of the load blocks are shaped to engage the flanges of the pulleys 12 and 14 of the CVT 10. It is relatively easy to create a uniform outside surface 88 for contacting the pulleys when the load block is a solid metal load block. If the plates of some of the prior art load blocks varied slightly in size or were positioned differently around the chain-belt, slight variations could be present on the outside edges that were disposed to contact the pulleys of the CVT. Such variations can result in an uneven outside surface for the load block. In this situation not all of the plates that form the load block may be contacted by the pulleys of the CVT. When this occurs there is uneven load sharing between the plates that form the load block and the load block is less effective in transferring torque between the pulleys and in resisting wear during use of the CVT. The solid, monolithic blocks of the present invention eliminate the above deficiency of some of the prior art load blocks.

The load blocks 50 of the present invention are very easy to position on the chain-belt 32. The load blocks are positioned in the passageway 80 formed by the opposed toes 42A and 42B that extend from each link 36 of the chain-belt. It is easy to position the load blocks in the passageway 80 and then use the retaining links 92 to secure the load blocks from movement in the passageway. This is a much easier construction method than prior art load blocks that required the chain-belt to be positioned in an opening in the load block. The load blocks were then held in place by the pins that secured adjacent sets of links together. This prior art system essentially required the load blocks to be positioned on the chain-belt during the formation of the chain-belt. Such a structure is more difficult and expensive to utilize than the load blocks of the present invention. Accordingly, the present invention provides a chain-belt for a CVT that is much cheaper and easier to assemble than many prior art chain-belts.

The load blocks 50 of the present invention drive directly against the links of the chain-belt. The load placed upon the load blocks 50 by the pulleys of the CVT is transferred to the crotch area 48 of the links 36. This load is spread across the entire width of the chain-belt 32. This is a very effective way to transfer the force from the load blocks 50 to the chain-belt 32. In many prior chain-belts the load blocks were held in place on the chain-belt by the pivot pins that joined the adjacent sets of links to form the chain-belt or by tabs on the links. These systems resulted in very high loads on a small portion of the pins or links and the load blocks. Such high loads frequently limited the forces that could be effectively handled by such a chain-belt construction. The present invention provides a system for transferring the forces from the load blocks 50 to the chain-belt 32 which significantly improves the load carrying capacity of the chain-belt.

Figure 7:
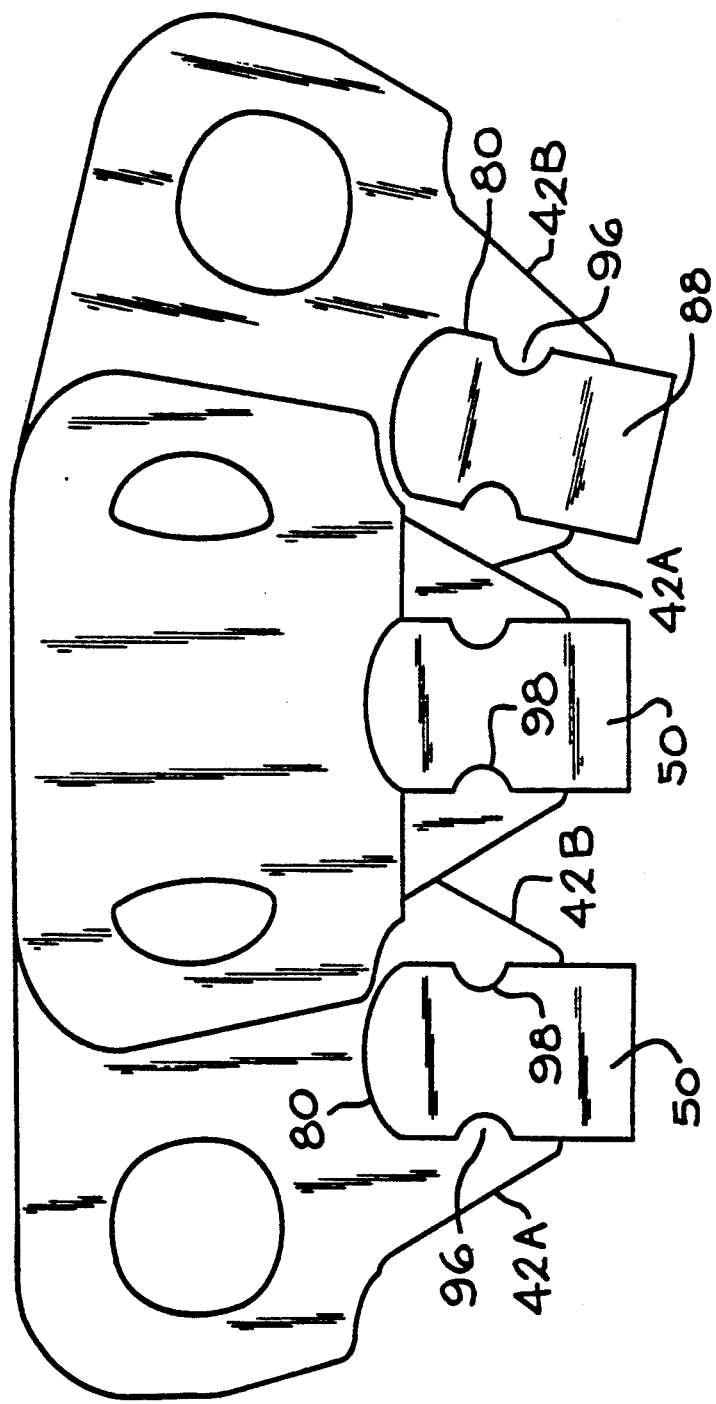
FIG. 7 is a side elevation view of another embodiment of the present invention.

FIG. 7 shows another embodiment of the invention wherein each toe 42A, 42B, has a projection 96 that extends into the passageway 80. A groove 98 is located on each side of the load blocks 50. The grooves 98 are disposed to be in alignment with the projections 96 located on the toes. When the load blocks 50 are positioned on the chain-belt 32 the projections 96 extend into grooves 98 and act to retain the load blocks 50 in position adjacent to the links 36 of the chain-belt.

Figure 8:
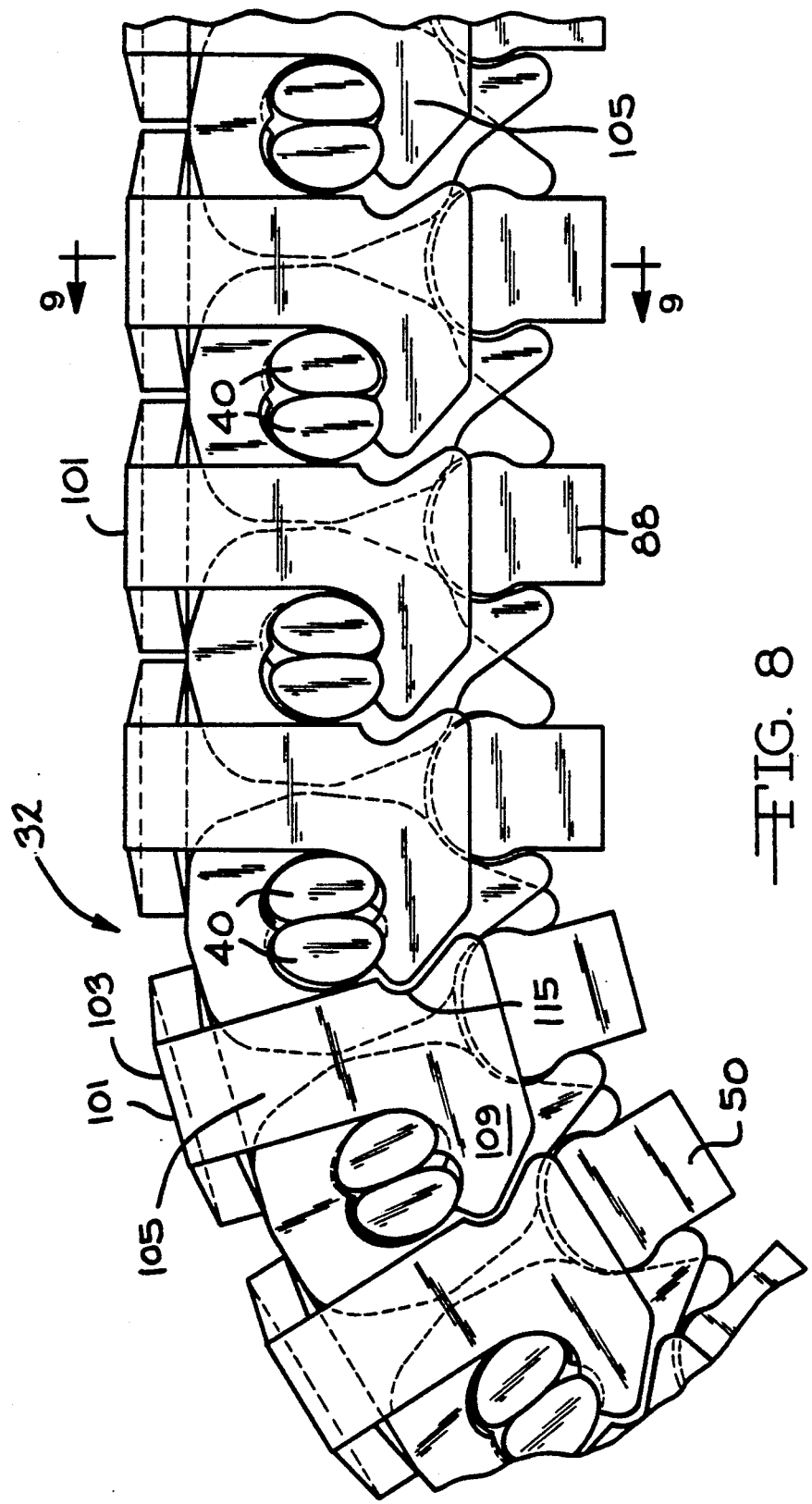
FIG. 8 is a side elevational view of another embodiment of the present invention.
Figure 9:
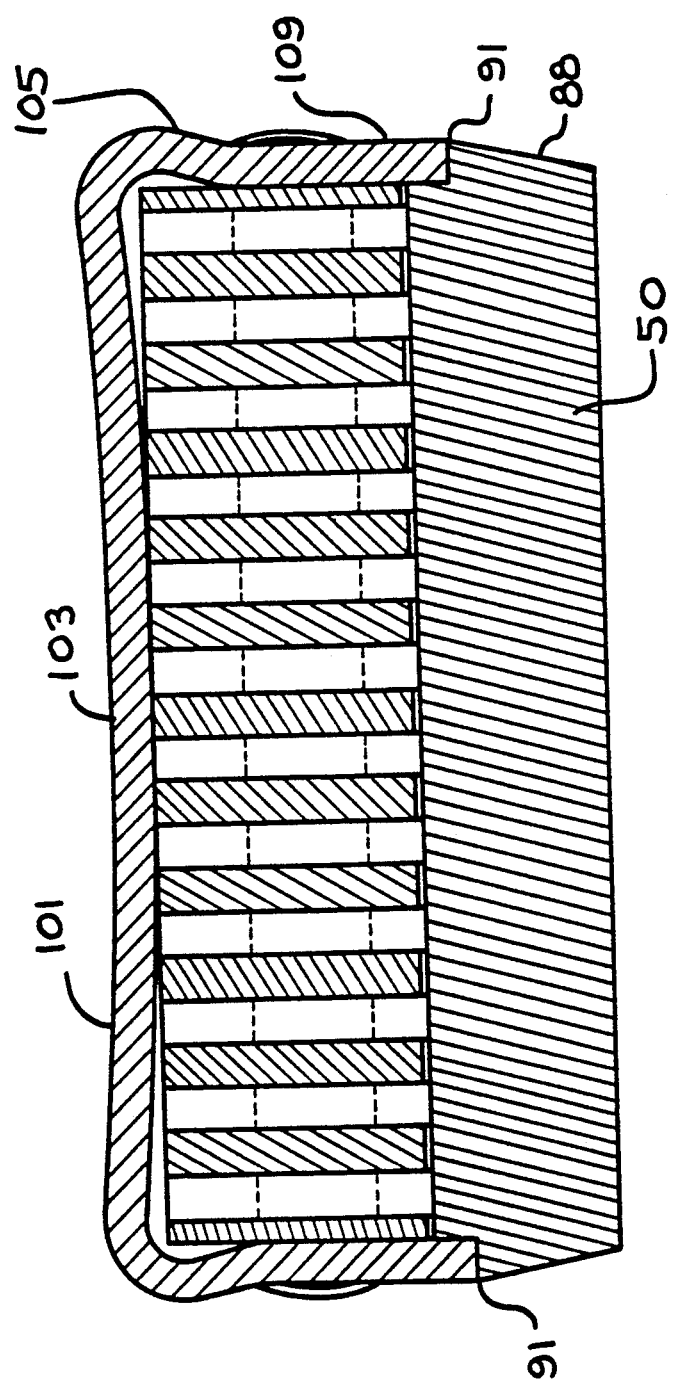
FIG. 9 is a cross-sectional view taken along line 9—9 in FIG. 8.
Figure 10:
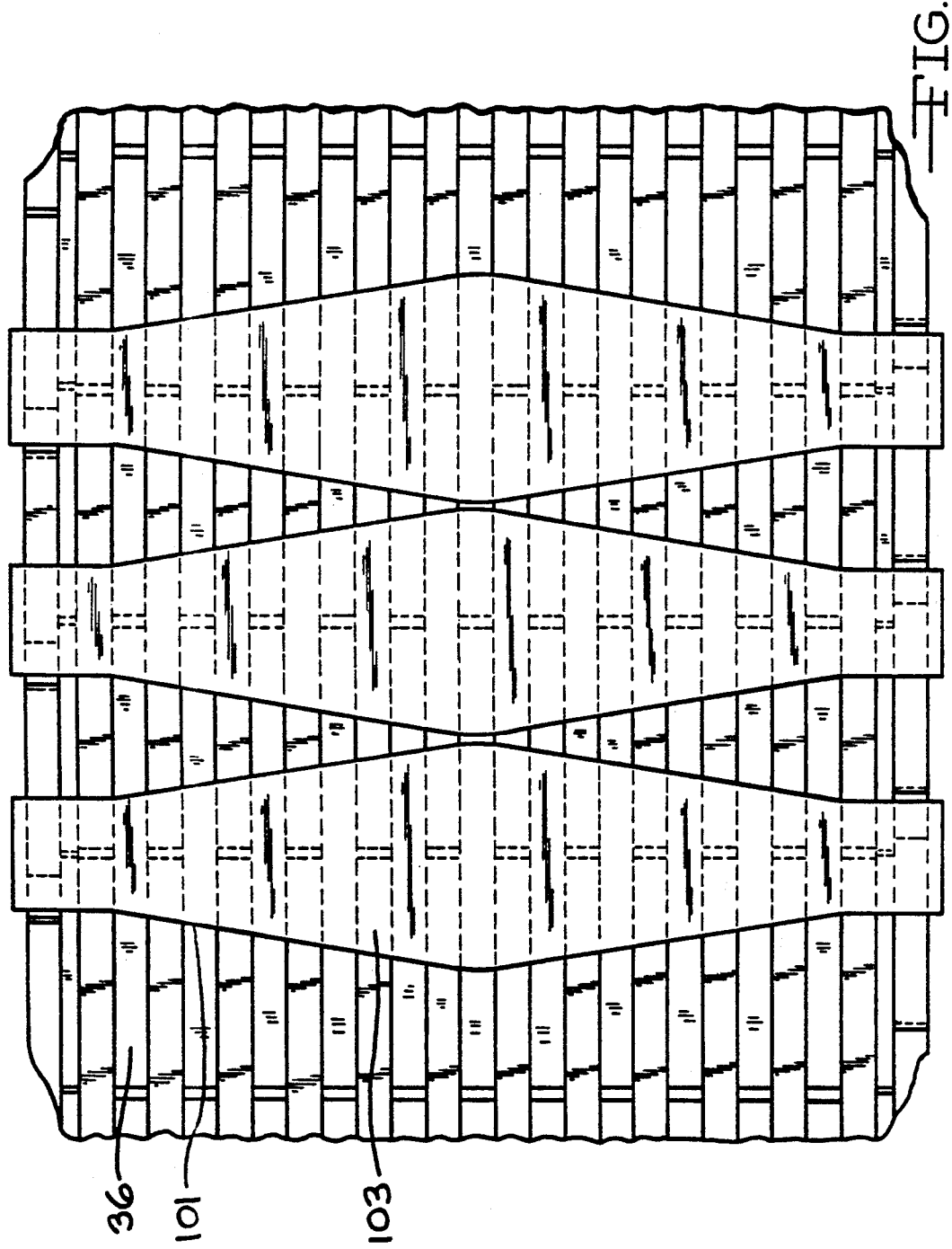
FIG. 10 is a top view of the embodiment of FIG. 8.

FIGS. 8, 9, 10 and 11 show another embodiment that can be used to restrain the load blocks 50 from transverse movement on the chain belt 32. In this embodiment a plurality of retainer brackets 101 are used to secure the load blocks 50 to the chain belt. The retainer brackets 101 are positioned on each set 34 of links 36 and have a first section 103 that extends across the side of the links 36 that is in spaced apart, opposed relationship to the passageway 80. A second section 105 of the retainer bracket extends along the sides of the links. The second section 105 terminates in a foot 109 and the foot extends under the pivot means 40. The pivot means secures each end of the retainer bracket 101 to the chain-belt 32. The retainer bracket also extends over at least a portion of the ends of the load blocks 50 to retain the load blocks from movement transverse to the direction of travel of the chain-belt. The notch 91 on the ends of the load blocks 50 can be disposed to receive the foot 109 on the second section 105 of the retainer bracket 101. As shown in FIGS. 9 and 10 the notch 91 can be positioned at the very end of the load blocks 50. The notches 91 on the ends of the load blocks 50 can be made slightly larger than the thickness of the foot 109 on the retainer bracket 101. This construction for the notches 91 allows the load blocks 50 to move slightly in a transverse direction in the passageways 80 to allow the load blocks 50 to be aligned as the load blocks 50 pass through the pulleys of the CVT 10. However, the retainer brackets 101 still function to keep the load blocks 50 in the passageways 80 formed by the links 36.

Figure 11:
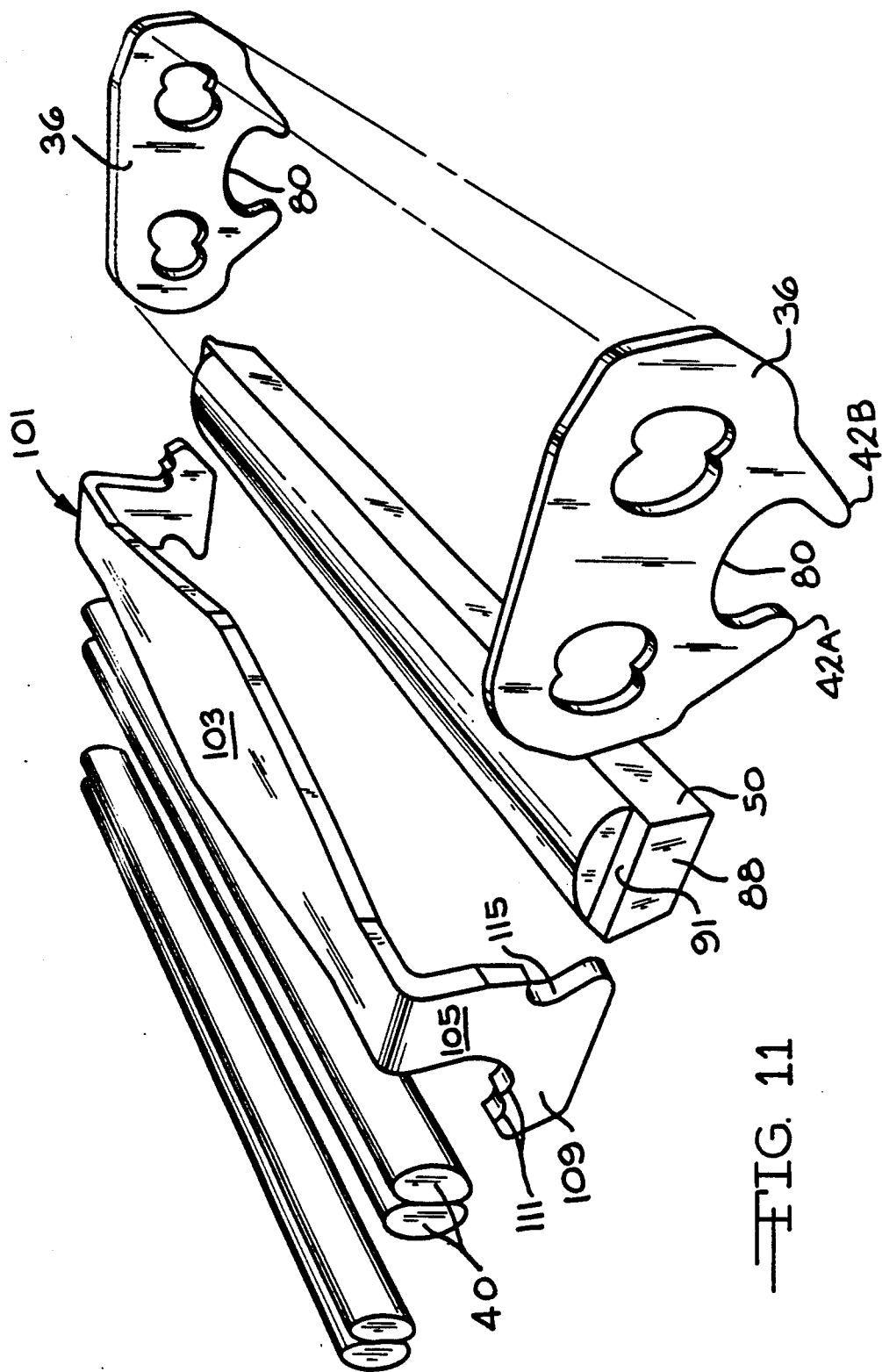
FIG. 11 is an exploded perspective view showing the components of this embodiment.

The retainer bracket 101 can have second sections 105 that are symetrical or the second sections can be asymetrical. In practice it has been found to be preferable to have the second sections be asymetrical as shown in FIGS. 8 and 11. With an asymetrical configuration a foot 109 on each side of the retainer bracket 101 extends in opposite directions and each foot 109 engages a pivot means 40 located at one end of the sets of links 36. In this manner the retainer bracket 101 is held by the pivot means 40 associated with one set of links and there is no relative motion between the pivot means and the retainer bracket. The foot 109 on each end of the retainer bracket can have a grooved section 111 that is disposed to be in alignment with the pivot means 40. The grooved section 111 allows the pivot means to rotate without causing substantial movement in the retainer bracket. The second section 105 is also constructed so that there is a clearance with the pivot means 40 so that rotation of the pivot means 40 does not cause the retainer bracket 101 to move.

A recess 115 can also be positioned on the second section 105 of the retainer bracket 101 in opposed relationship to the foot 109. The recess 115 is disposed to receive the foot 109 on the adjacent retainer bracket 101. This allows adjacent retainer brackets to nest together to take up less space and to have less possible interference as the chain-belt articulates.

The first section 103 of the retainer bracket can also be curved in a manner to deflect towards the links 36. When the retainer bracket 101 is positioned on the links 36 the first section is displaced by the links and acts like a spring. Accordingly, the first section 103 acts to pull the second section 105 in a direction away from the load blocks 50. As the foot 109 is positioned under the pivot means 40 the spring action of the first section 103 acts to keep the foot 109 on each side of the retainer bracket 101 in contact with the pivot means 40. The spring action of the first section 103 thereby assists in maintaining the retainer bracket 101 in position on the chain-belt.

The embodiment shown in FIGS. 8-11 functions basically in the same manner as the previously described chain-belt and has the same advantages of the previously described chain-belt. In addition, it is very easy to position the load blocks 50 in the passageway 80. After the sets of links 36 have been completely assembled, the load blocks 50 can be positioned in the passageway 80 and the retainer brackets 101 positioned on the chain-belt to hold the load blocks in position in the passageways 80.

Figure 12:
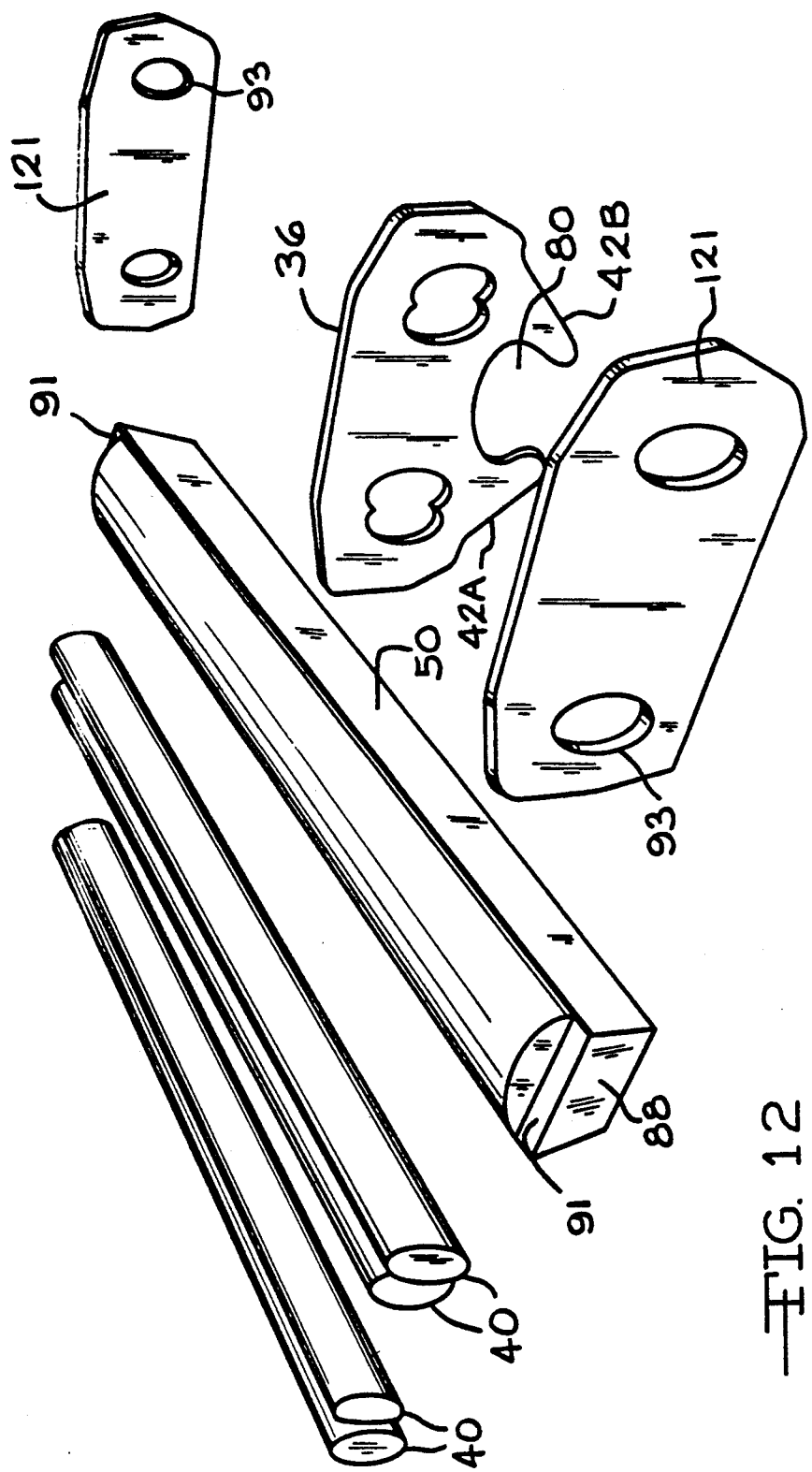
FIG. 12 is an exploded perspective view showing the components for another embodiment of the present invention.
Figure 13:
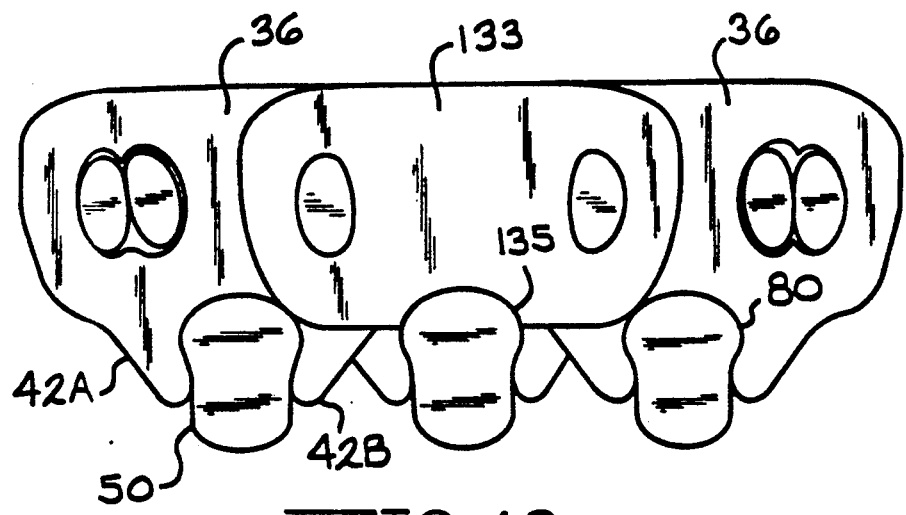
FIG. 13 is a side elevation view of another embodiment of the invention.
Figure 15:
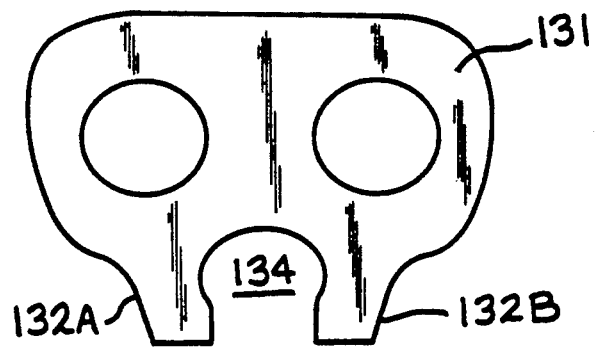
FIG. 15 is a side elevation view of the component of FIG. 14.

FIG. 12 shows another embodiment of the invention where the load blocks 50 have a notch 91 that is located on each end of the load block 50. The notches 91 are cut into the very end of the load blocks 50. A guide link 121 is positioned as the outer link on each side of the chain-belt 32. The guide links 121 extend into the notches 91.

Ends of selected ones of the pin pivot means 40 are fit into end openings 93 of the guide links 121. The guide links 121 act to restrain the load blocks 50 from movement in a direction transverse to the direction of travel of the chain-belt 32. The guide links 121 act to retain the load blocks 50 in the passageway 80 formed by the toes on the links 36. The notches 90 can be made slightly larger than the thickness of the guide links 121 to allow slight transverse movement of the load blocks. This slight transverse movement of the load blocks allows the load blocks to be aligned as the load blocks 50 pass through the pulleys of the CVT 10. The slight transverse movement of the load blocks also reduces wear between the load blocks 50 and the guide links 121.

Figure 14:
FIG. 14 is a plan view of a component of the embodiment of FIG. 13.
Figure 16:
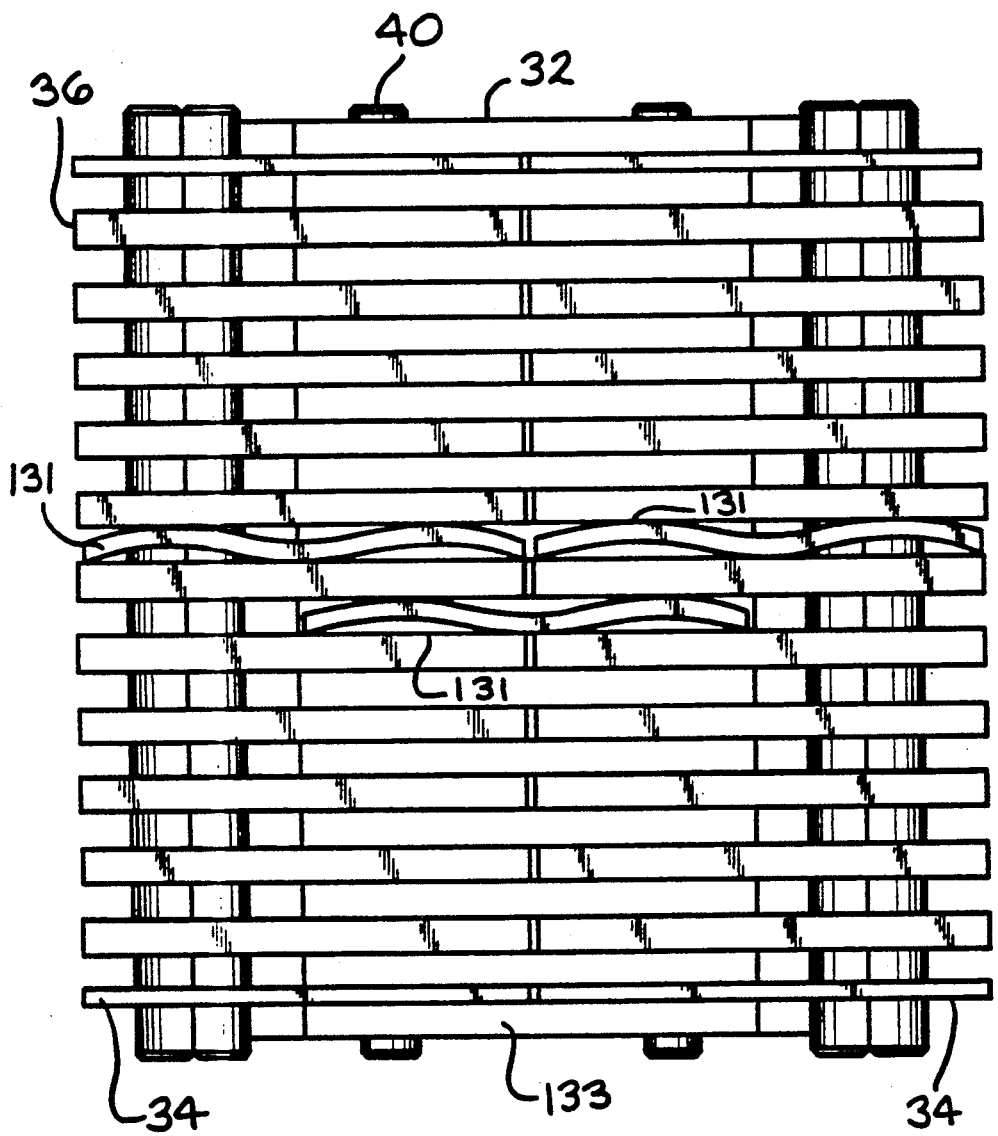
FIG. 16 is a plan view of this embodiment of the invention.
Figure 17:
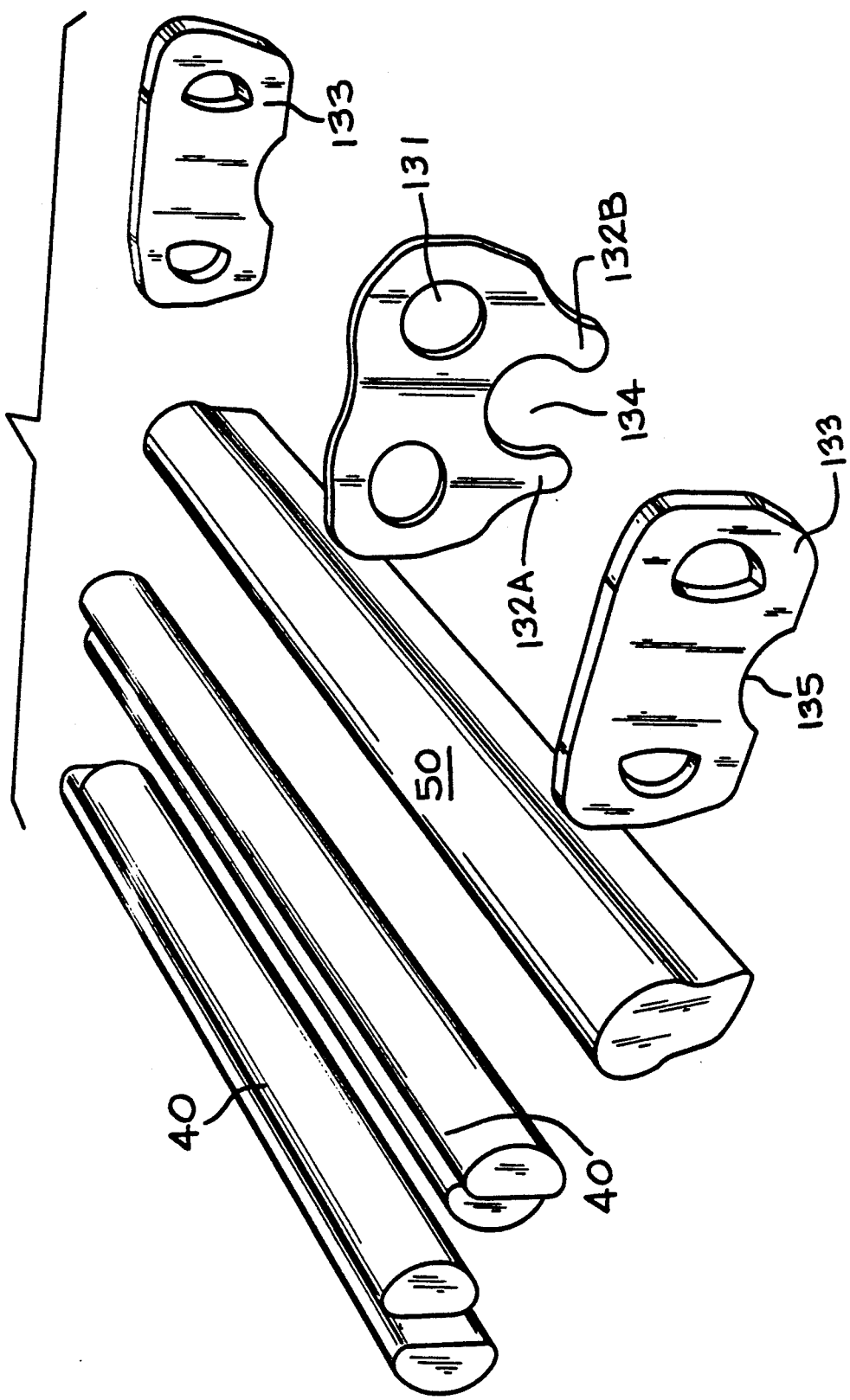
FIG. 17 is an exploded perspective view showing the components of the embodiment of FIG. 13 of the invention.

FIGS. 13-17 show another embodiment of the invention where a spring link 131 is positioned in the previously described chain-belt 32. The spring link 131 has toes 132A and 132B and forms a channel 134 for the load bocks 50. One spring link 131 is positioned in each set of links 36 of the chain belt. The channel 134 of the spring link is in substantial alignment with the passageway 80 formed by the other links 36 of the chain-belt 32 for receiving the load blocks 50. However, the channel 134 of the spring link 131 is slightly smaller than the passageway 80 and the load block 50 is press fit into the channel 134 so that the load block is secured to the spring link 131. The spring link 131 thereby acts to hold the load block from being displaced in a transverse direction from the passageway 80. The spring link 131 has a substantially sine wave shape when viewed from the top of the chain-belt as shown in FIG. 14. The sine wave shape allows the spring link 131 to flex or bend in a transverse direction to accomodate small transverse movement of the load blocks 50. This small transverse movement keeps the load blocks 50 from moving relative to the spring link 131 and maintains the press fit between the load block 50 and the spring link 131. Without the ability of the spring link 131 to move with the load block 50 the press fit would be loosened as the load blocks 50 were aligned as the load blocks 50 move through the pulleys of the CVT 10. The use of the spring link 131 allows the grooves or notches to be eliminated from the load blocks 50. The retaining links 133 on each side of the chain-belt 32 that hold the links of the chain-belt together have a groove 135 that fits over the top of the load block 50. The use of the spring link 131 eliminates possible wear problems between the retaining links and the notches in the load blocks. This construction for the chain-belt also allows the load blocks 50 to be inserted into the passageway 80 as a secondary operation after the links 36 of the chain-belt have been assembled. This simplifies and reduces the cost of assembling the chain-belt. Although only one spring link 131 has been shown in each set 34 of links 36, it should be understood that more than one spring link can be used if desired and that different positions in the set of links can be utilized for the spring links.

The above description is given for the sake of explanation. Various substitutions and modifications, other than those cited, can be made without departing from the scope of the following claims.

We claim:

1. A power transmission (10) chain-belt (32) especially adaptable for connecting the pulleys (12, 14) of a pulley transmission (16) comprising:

a plurality of interleaved sets (34) of links (36), each set (34) having a plurality of transversely arranged links (36);

pivot means (40) joining said adjacent sets (34) of links (36) to form an endless loop;

at least one toe (42A, 42B) extending from each link (36) in said sets (34) of links (36), at least said toes (42A, 42B) on adjacent links (36) being in opposed relationship and said toes (42A, 42B) defining a passageway (80);

a plurality of load blocks (50) positioned in said passageways (80) defined by said toes (42A, 42B) and extending from said passageway (80) in a direction away from said sets (34) of links (36), said passageway (80) acting to maintain said load blocks (50) adjacent said links, each load block (50) having edge surfaces (88) for contacting said pulleys (12, 14) of said transmission (10); and at least one spring link (131) positioned in said sets (34) of interleaved links (36), said spring link (131) having a pair of spaced apart, opposed toes (132A, 132B), said toes (132A, 132B) defining a channel (134) for receiving said load blocks (50), said channel (134) of said spring link (131) having a press fit with said load block (50) whereby said spring link (131) restrains said load block (50) from movement transverse to the direction of travel of said chain-belt (32) and retains said load block (50) in said passageway (80) defined by said sets (34) of links (36).

2. The chain-belt (32) of claim 1, wherein said portion of said opposed toes (32A, 32B) that form said passageway (80) have an arcuate shape and said toes (32A, 32B) form a substantially circular passageway (80) with the ends of said opposed toes (32A, 32B) that are spaced apart from said pivot means (40) defining an opening (82).

3. The chain-belt (32) of claim 1, wherein said load blocks (50) are solid metal blocks that extend substantially across the width of said interleaved sets (34) of links (36).

4. The chain-belt (32) of claim 3, wherein said load blocks (50) have a region (84) for positioning in said passageway (80) formed by said opposed toes (42A, 42B), said region (84) of said load blocks (50) having substantially the same shape and size as said passageways (80), said passageways (80) having a shape to retain said load blocks (50) in position adjacent said links (36).

5. The chain-belt (32) of claim 1, wherein said spring link (131) is deformable and can deflect in a direction transverse to the direction of travel of said chain-belt (32) whereby said spring link (131) can accomodate slight transverse movement of said load block (50).

6. The chain-belt (32) of claim 5, wherein said spring link (131) has a generally sinusodial shape when viewed in a direction parallel to the direction of travel of said chain-belt (32), said sinusodial shape of said spring link (131) deforming to accomodate slight transverse movement of said load block (50).

7. The chain-belt (32) of claim 6, wherein said spring link (131) is positioned between two other links (36) in said set (34) of links (36), the transverse movement of said spring link (131) being defined by the space between said links (36) on each side of said spring link (131).

8. The chain-belt (32) of claim 3, wherein said load blocks (50) have uniform edge surfaces (88) for contacting said pulleys (12, 14) whereby said edge surfaces (88) uniformly transfer the load from said pulleys (12, 14) to said links (36).

9. The chain-belt (32) of claim 2, wherein said passageway (80) has points of contact (47) on each side of said load blocks (50), said points of contact (47) engaging said load blocks (50) to stabilize and substantially eliminate rotation of said load blocks (50) during use of said chain-belt (32).

10. A power transmission (10) chain-belt (32) especially adaptable for connecting the pulleys (12, 14) of a pulley transmission (16) comprising:

a plurality of interleaved sets (34) of links (36), each set (34) having a plurality of transversely arranged links (36);

pivot means (40) joining said adjacent sets (34) of links (36) to form an endless loop;

at least one toe (42A, 42B) extending from each link (36) in said sets (34) of links (36), at least said toes (42A, 42B) on adjacent links (36) being in opposed relationship and said toes (42A, 42B) defining a passageway (80);

a plurality of load blocks (50) positioned in said passageways (80) defined by said toes (42A, 42B) and extending from said passageway in a direction away from said sets (34) of links (36), each load block (50) having edge surfaces (88) for contacting said pulleys (12, 14) of said transmission (10); and at least one spring link (131) positioned in said sets (34) of interleaved links (36), said spring link (131) having a pair of spaced apart, opposed toes (132A, 132B), said toes (132A, 132B) defining a channel (134) for receiving said load blocks (50), said channel (134) of said spring link (131) having a press fit with said load block (50) whereby said spring link (131) retains said load block (50) in said passageway (80) defined by said sets (34) of links (36), said spring link (131) being deformable and capable of deflecting in a direction transverse to the direction of travel of said chain-belt (32) whereby said spring link (131) can accomodate slight transverse movement of said load blocks (50).

11. The chain-belt (32) of claim 10, wherein said portion of said opposed toes (32A, 32B) that form said passageway (80) have an arcuate shape and said toes (32A, 32B) form a substantially circular passageway (80) with the ends of said opposed toes (32A, 32B) that are spaced apart from said pivot means (40) defining an opening (82).

12. The chain-belt (32) of claim 10, wherein said load blocks (50) are solid metal blocks that extend substantially across the width of said interleaved sets (34) of links (36).

13. The chain-belt (32) of claim 12, wherein said load blocks (50) have a region (84) for positioning in said passageway (80) formed by said opposed toes (42A, 42B), said region (84) of said load blocks (50) having substantially the same shape and size as said passageways (80), said passageways (80) having a shape to retain said load blocks (50) in position adjacent said links (36).

14. The chain-belt (32) of claim 10, wherein said spring link (131) has a generally sinusodial shape when viewed in a direction parallel to the direction of travel of said chain-belt (32), said sinusodial shape of said spring link (131) deforming to accomodate slight transverse movement of said load block (50).

15. The chain-belt (32) of claim 14, wherein said spring link (131) is positioned between two other links (36) in said set (34) of links (36), the transverse movement of said spring link (131) being defined by the space between said links (36) on each side of said spring link (131).

16. The chain-belt (32) of claim 12, wherein said load blocks (50) have uniform edge surfaces (88) for contacting said pulleys (12, 14) whereby said edge surfaces (88) uniformly transfer the load from said pulleys (12, 14) to said links (36).

17. The chain-belt (32) of claim 11, wherein said passageway (80) has points of contact (47) on each side of said load blocks (50), said points of contact (47) engaging said load blocks (50) to stabilize and substantially eliminate rotation of said load blocks (50) during use of said chain-belt (32).

18. A power transmission (10) chain-belt (32) especially adaptable for connecting the pulleys (12, 14) of a pulley transmission (16) comprising:
  a plurality of interleaved sets (34) of links (36), each set (34) having a plurality of transversely arranged links (36);
  pivot means (40) joining said adjacent sets (34) of links (36) to form an endless loop;
  a passageway (80) by each sets (34) of links (36);
  a plurality of load blocks (50) positioned in said passageway (80) and extending from said passageway (80) in a direction away from said sets (34) of links (36), said passageway (80) acting to maintain said load blocks (50) adjacent said links, each load block (50) having edge surfaces (88) for contacting said pulleys (12, 14) of said transmission (10); and
  at least one spring link (131) positioned in said sets (34) of interleaved links (36), said spring link (131) defining a channel (134) for receiving said load blocks (50), said channel (134) of said spring link (131) having a press fit with said load block (50) whereby said spring link (131) restrains said load block (50) from movement transverse to the direction of travel of said chain-belt (32) and retains said load block (50) in said passageway (80) defined by said sets (34) of links (36).

19. The chain-belt (32) of claim 18, wherein said passageway (80) has a substantially arcuate shape and said load blocks (50) have a region (84) for positioning in said passageway (80), said region (84) having substantially the same shape and size as said passageway (80), said passageway (80) having a shape that engages said region (84) to retain said load blocks (50) adjacent said links (36).

20. The chain-belt (32) of claim 19, wherein said load blocks (50) are solid metal blocks that extend substantially across the width of said interleaved sets (34) of links (36).

21. The chain-belt (32) of claim 18, wherein said spring link (131) is deformable and can deflect in a direction transverse to the direction of travel of said chain-belt (32) whereby said spring link (131) can accomodate slight transverse movement of said load blocks (50).

22. The chain-belt (32) of claim 21, wherein said spring link (131) has a generally sinusodial shape when viewed in a direction parallel to the direction of travel of said chain-belt (32), said sinusodial shape of said spring line (131) deforming to accomodate slight transverse movement of said load blocks (50).

23. The chain-belt (32) of claim 22, wherein said spring link (131) is positioned between two other links (36) in said set (34) of links (36), the transverse movement of said spring link (131) being defined by the space between said links (36) on each side of said spring link (131).

24. The chain-belt (32) of claim 18, wherein said passageway (80) has points of contact (47) on each side of said load blocks (50), said points of contact (47) engaging said load blocks (50) to stabilize and substantially eliminate rotation of said load blocks (50) during use of said chain-belt (32).

* * * * *